(12) United States Patent
Pires Dos Reis Moreira et al.

(10) Patent No.: US 7,788,465 B2
(45) Date of Patent: Aug. 31, 2010

(54) PROCESSING SYSTEM INCLUDING A RECONFIGURABLE CHANNEL INFRASTRUCTURE COMPRISING A CONTROL CHAIN WITH COMBINATION ELEMENTS FOR EACH PROCESSING ELEMENT AND A PROGRAMMABLE SWITCH BETWEEN EACH PAIR OF NEIGHBORING PROCESSING ELEMENTS FOR EFFICIENT CLUSTERING OF PROCESSING ELEMENTS

(75) Inventors: Orlando Miguel Pires Dos Reis Moreira, Eindhoven (NL); Alexander Augusteijn, Eindhoven (NL); Bernardo De Oliveira Kastrup Pereira, Eindhoven (NL); Wim Feike Dominicus Yedema, Eindhoven (NL); Paul Ferenc Hoogendijk, Eindhoven (NL); Willem Charles Mallon, Eindhoven (NL)

(73) Assignee: Silicon Hive B.V., Eindhoven (NL)

( * ) Notice: Subject to any disclaimer, the term of this patent is extended or adjusted under 35 U.S.C. 154(b) by 965 days.

(21) Appl. No.: 10/541,275

(22) PCT Filed: Dec. 4, 2003

(86) PCT No.: PCT/IB03/05926

§ 371 (c)(1),
(2), (4) Date: Jun. 30, 2005

(87) PCT Pub. No.: WO2004/059464

PCT Pub. Date: Jul. 15, 2004

(65) Prior Publication Data

US 2006/0184766 A1   Aug. 17, 2006

(30) Foreign Application Priority Data

Dec. 30, 2002 (EP) .................................. 02080600

(51) Int. Cl.
    *G06F 15/80* (2006.01)
(52) U.S. Cl. ........................................... 712/11; 712/13
(58) Field of Classification Search .................... 712/11, 712/13, 220
    See application file for complete search history.

(56) References Cited

U.S. PATENT DOCUMENTS 5,212,777 A * 5/1993 Gove et al. .................. 712/229

(Continued)

OTHER PUBLICATIONS

Belton, David "Basic Gate and Functions" Dec. 06, 2000; http://www.ee.surrey.ac.uk/Projects/Labview/gatesfunc/index.html.*

(Continued)

*Primary Examiner*—Eddie P Chan
*Assistant Examiner*—Keith Vicary
(74) *Attorney, Agent, or Firm*—Leydig, Voit & Mayer Ltd.

(57) ABSTRACT

A processing system according to the invention comprises a plurality of processing elements (PE1, . . . , PE7). The processing elements comprise a controller and computation means. The plurality of processing elements is dynamically reconfigurable as mutually independently operating task units (TU1, TU2, TU3), which task units comprise one processing element (PE7) or a cluster of two or more processing elements (PE3, PE4, PE5, PE6). The processing elements within a cluster are arranged to execute instructions under a common thread of program control. In this way the processing system is capable of using the same sub-set of data-path elements to exploit instruction level parallelism or task level parallelism or a combination thereof, dependent on the application.

27 Claims, 7 Drawing Sheets

U.S. PATENT DOCUMENTS

| | | | | |
|---|---|---|---|---|
| 5,475,856 A | * | 12/1995 | Kogge | 712/20 |
| 5,664,214 A | * | 9/1997 | Taylor et al. | 712/20 |
| 5,774,369 A | * | 6/1998 | Horstmann et al. | 716/2 |
| 5,805,915 A | * | 9/1998 | Wilkinson et al. | 712/20 |
| 5,828,894 A | * | 10/1998 | Wilkinson et al. | 712/20 |
| 5,878,241 A | * | 3/1999 | Wilkinson et al. | 712/203 |
| 6,167,501 A | * | 12/2000 | Barry et al. | 712/11 |
| 6,219,776 B1 | * | 4/2001 | Pechanek et al. | 712/20 |
| 6,266,760 B1 | | 7/2001 | DeHon et al. | |
| 6,487,651 B1 | * | 11/2002 | Jackson et al. | 712/13 |
| 2005/0154858 A1 | * | 7/2005 | Kravec et al. | 712/11 |
| 2006/0212678 A1 | * | 9/2006 | De Oliveira Kastrup Pereira | 712/11 |

OTHER PUBLICATIONS

PLA Logic Reduction Technique; IBM Technical Disclosure Bulletin NN81091837, Sep. 1981, US; vol. 4, issue 4, pp. 1837-1841.*

"Method for Removing Redundancies From Programmable Logic Arrays"; IBM Technical Disclosure Bulletin, Mar. 1986, US, vol. 28, isssue 10, pp. 4677-4682.*

"Efficient interconnects for clustered microarchitectures," Parcerisa, J.-M. Sahuquillo, J. Gonzalez, A. Duato, J. Parallel Architectures and Compilation Techniques, 2002. Proceedings. 2002 International Conference on Publication Date: 2002 on pp. 291-300.*

Architecture and Implementation of a VLIW Supercomputer by Colwell et al., in Proc. of Supercomputing '90, pp. 910-919.

* cited by examiner

PROCESSING SYSTEM INCLUDING A RECONFIGURABLE CHANNEL INFRASTRUCTURE COMPRISING A CONTROL CHAIN WITH COMBINATION ELEMENTS FOR EACH PROCESSING ELEMENT AND A PROGRAMMABLE SWITCH BETWEEN EACH PAIR OF NEIGHBORING PROCESSING ELEMENTS FOR EFFICIENT CLUSTERING OF PROCESSING ELEMENTS

A Very Long Instruction Word processor (VLIW processor) is capable of executing many operations within one clock cycle. Generally, a compiler reduces program instructions into basic operations that the processor can perform simultaneously. The operations to be performed simultaneously are combined into a very long instruction word (VLIW). The instruction decoder of the VLIW processor decodes and issues the basic operations comprised in a VLIW each to a respective processor data-path element. Alternatively, the VLIW processor has no instruction decoder, and the operations comprised in a VLIW are directly issued each to a respective processor data-path element. Subsequently, these processor data-path elements execute the operations in the VLIW in parallel. This kind of parallelism, also referred to as instruction level parallelism (ILP), is particularly suitable for applications which involve a large amount of identical calculations, as can be found e.g. in media processing. Other applications comprising more control oriented operations, e.g. for servo control purposes, are not suitable for programming as a VLIW-program. However, often these kind of programs can be reduced to a plurality of program threads which can be executed independently of each other. The execution of such threads in parallel is also denoted as thread-level parallelism (TLP). A VLIW processor is, however, not suitable for executing a program using thread-level parallelism. Exploiting the latter type of parallelism requires that different subsets of processor data-path elements have an independent control flow, i.e. that they can access their own programs in a sequence independent of each other, e.g. are capable of independently performing conditional branches. The data-path elements in a VLIW processor, however, operate in a lock-step mode, i.e. they all execute a sequence of instructions in the same order. The VLIW processor could, therefore, only execute one thread.

It is a purpose of the invention to provide a processor which is capable of using the same sub-set of data-path elements to exploit instruction level parallelism or task level parallelism or a combination thereof, dependent on the application.

For that purpose, a processor according to the invention comprises a plurality of processing elements, the processing elements comprising a controller and computation means, the plurality of processing elements being dynamically reconfigurable as mutually independently operating task units, which task units comprise one processing element or a cluster of two or more processing elements, the processing elements within a cluster being arranged to execute instructions under a common thread of program control. Processing elements in a cluster are said to run in lock-step mode. The computation means can comprise adders, multipliers, means for performing logical operations, e.g. AND, OR, XOR etc, lookup table operations, memory accesses, etc.

It is noted that "Architecture and Implementation of a VLIW Supercomputer" by Colwell et all, in Proc. of Supercomputing '90, pp. 910-919, describe a VLIW processor, which can either be configured as two 14-operations-wide processors, each independently controlled by a respective controller, or one 28-operations-wide processor controlled by one controller. Said document, however, neither discloses the principle of a processor array which can be reconfigured into an arbitrary number of independently operating clusters comprising an arbitrary number of processing elements, nor does it disclose how such a processor array could be realized.

In a processor array according to the present invention, the processing elements can operate all independently or all in lock-step mode. Contrary to the prior art, the invention also allows clusters of processing elements to operate independently of each other while the processing elements within each cluster can perform a task using instruction level parallelism. In this way, the processor can dynamically adapt its configuration to the most suitable form depending on the task. In a task having few possibilities for exploiting parallelism at instruction level, the processor can be configured as a relatively large number of small clusters (e.g. comprising only one, or a few, processing elements). This makes it possible to exploit parallelism at thread-level. If the task is very suitable for exploiting instruction level parallelism, as is often the case in media processing, the processor can be reconfigured to a small number of large clusters. The size of each cluster can be adapted to the requirements for processing speed. This makes it possible to have several threads of control flow in parallel, each having a number of functional units that matches the ILP that can be exploited in that thread. The configuration of the processor into clusters can be either static or dynamic. In the static case, the configuration remains the same throughout the application execution. In the dynamic case, it may be altered at run-time during application execution. The static case can be considered as a special case of the dynamic case.

U.S. Pat. No. 6,266,760 describes a reconfigurable processor comprising a plurality of basic functional units, which can be configured to execute a particular function, e.g. as an ALU, an instruction store, a function store, or a program counter. In this way the processor can be used in several ways, e.g. a micro-controller, a VLIW processor, or a MIMD processor. The document, however, does not disclose a processor comprising different processing elements each having a controller, wherein the processing elements can be configured in one or more clusters, and where processing elements within the same cluster operate under a common thread of control despite having their own controller, and wherein processors in mutually different clusters operate independently of each other, i.e. according to different threads of control.

U.S. Pat. No. 6,298,430 describes a user-configurable ultra-scalar multiprocessor which comprises a predetermined plurality of distributed configurable signal processors (DCSP) which are computational clusters that each have at least two sub microprocessors (SM) and one packet bus controller (PBC) that are a unit group. The DCSPs, the SM and the PBC are connected through local network buses. The PBC has communication buses that connect the PBC with each of the SM. The communication buses of the PBC that connect the PBC with each SM have serial chains of one hardwired connection and one programmably-switchable connector. Each communication bus between the SMs has at least one hardwired connection and two programmably-switchable connectors. A plurality of SMs can be combined programmably into separate SM groups. All of a cluster's SM can work either in an asynchronous mode, or in a synchronous mode, when clocking is made by a clock frequency from one SM in the cluster, which serves as the master. The known multi processor does not allow a configuration in clusters of an arbitrary size.

The processing elements preferably each have their own instruction memory, for example in the form of a cache. This facilitates independent operation of the processing elements. Alternatively, or in addition to the own local instruction memory, the processing elements may share a global memory.

These and other aspects are described in more detail with reference to the drawings.

Therein:

FIG. 1 schematically shows a processor system according to the invention,

Figure 4:
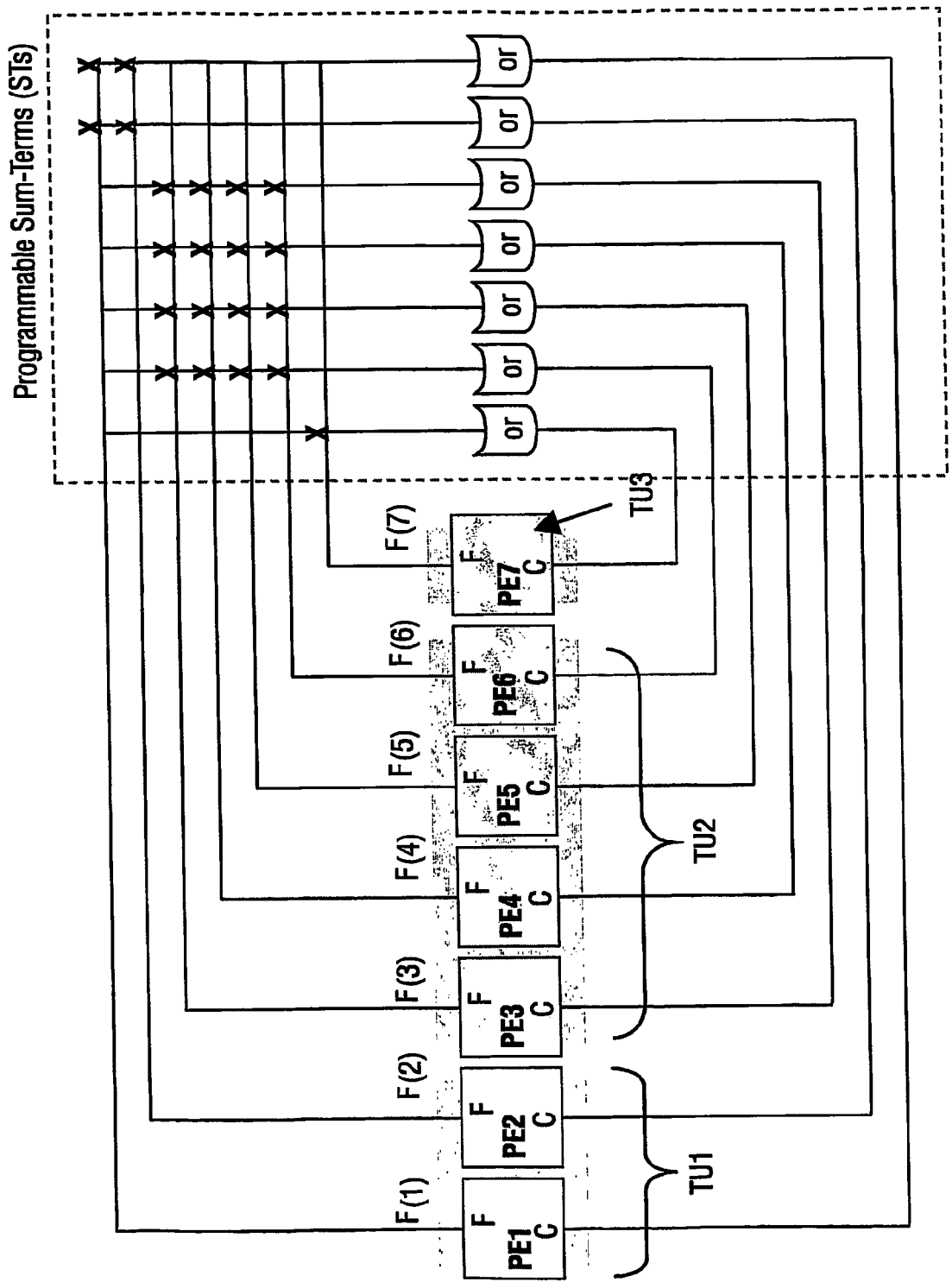
Figure 5:
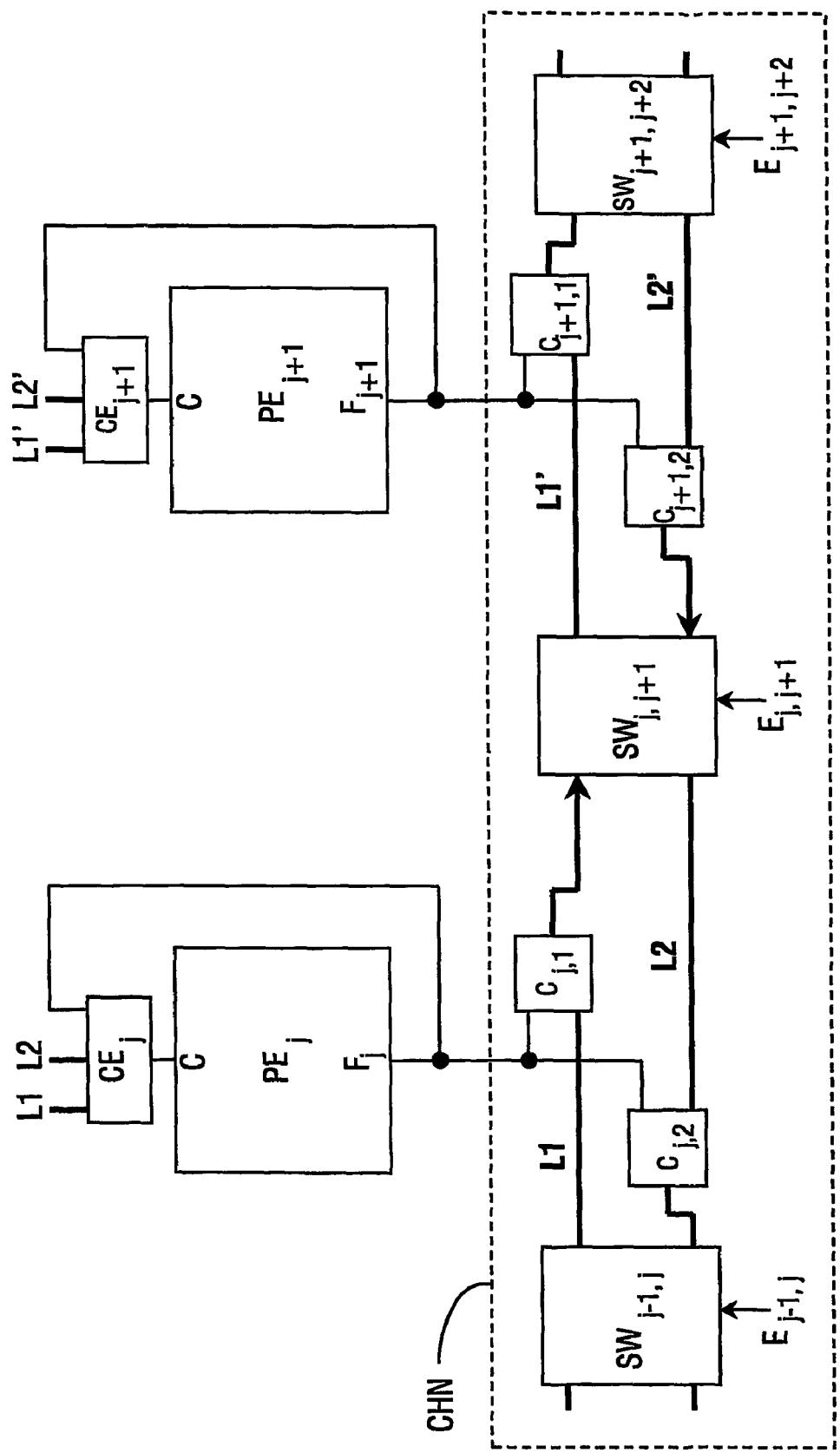
Figure 6:
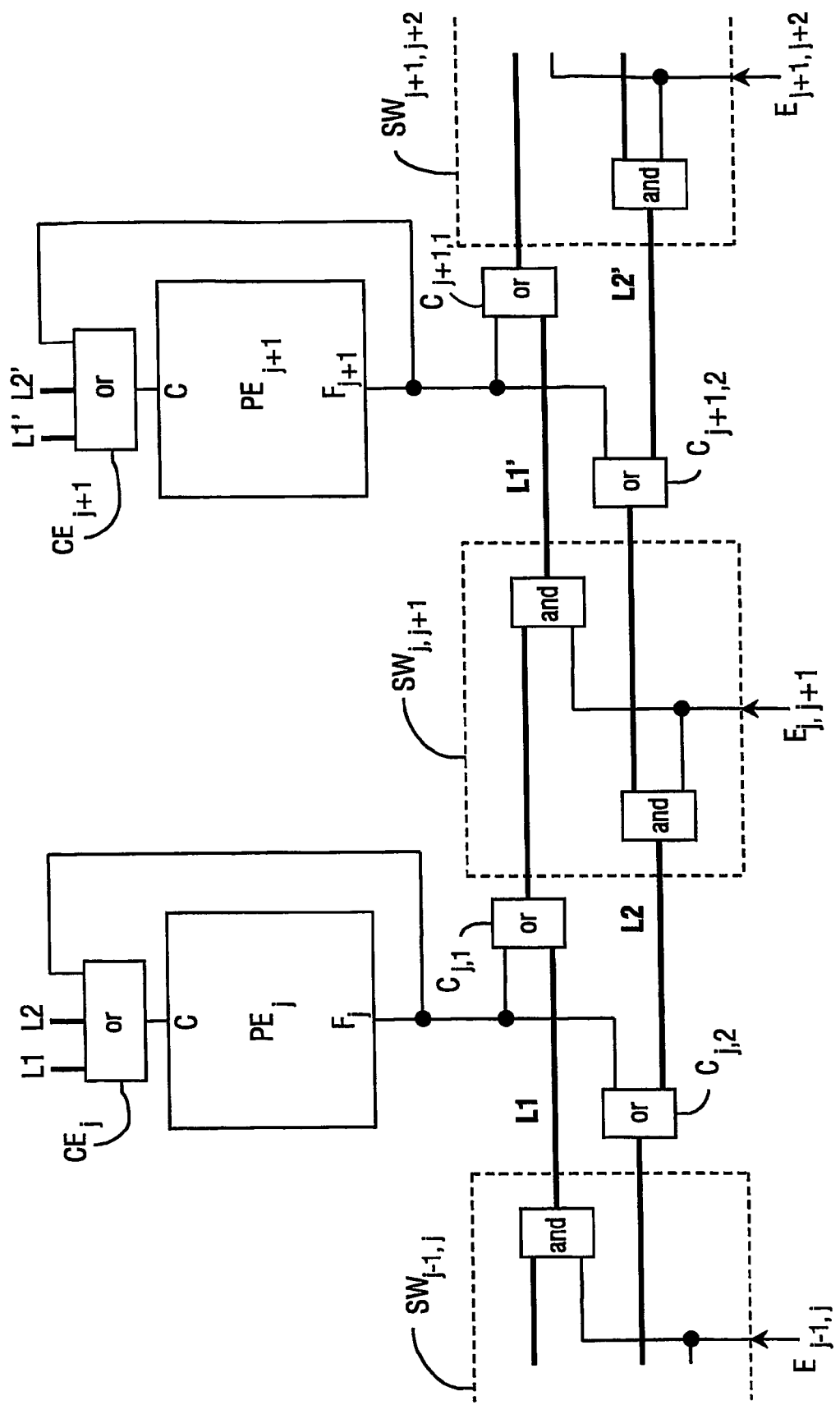
Figure 7:
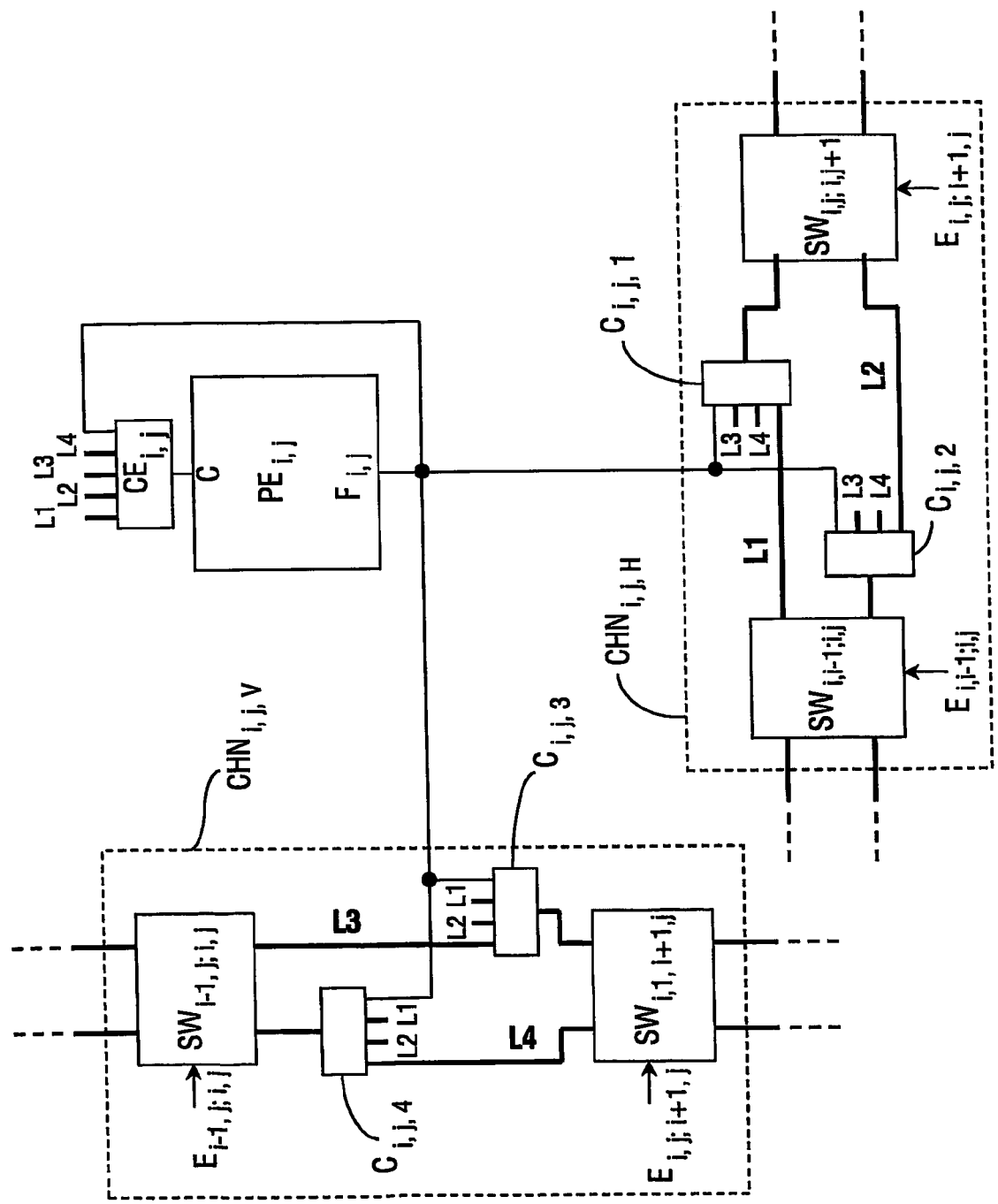

FIG. 4 shows a reconfigurable channel infrastructure in a first embodiment of the processing system, FIG. 5 shows a reconfigurable channel infrastructure in a second embodiment of the processing system, FIG. 6 shows a more detailed implementation of the processing system of FIG. 5, FIG. 7 shows a reconfigurable channel infrastructure in a third embodiment of the processing system, FIG. 8 shows several configurations of a processing system according to the invention.

Figure 1:
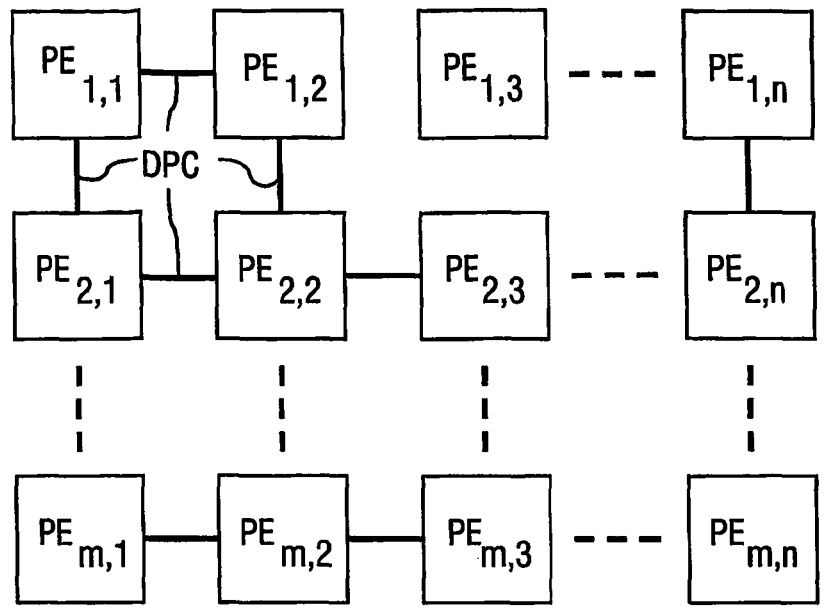

FIG. 1 schematically shows a processor system according to the invention. The processor system comprises a plurality of processing elements $PE_{1,1}, \ldots PE_{1,n}; PE_{2,1}, \ldots PE_{2,n}; PE_{m,1}, \ldots PE_{m,n}$. The processing elements can exchange data via data-path connections DPC. In the preferred embodiment shown in FIG. 1, the processing elements are arranged on a rectangular grid, and the data-path connections provide for data exchange between neighbouring processing elements. Non-neighbouring processing elements may exchange data by transferring it via a chain of mutually-neighbouring processing elements. Alternatively, or in addition, the processor system may comprise one or more global busses spanning sub-sets of the processing elements, or point-to-point connections between any pair of processing elements.

Figure 2:
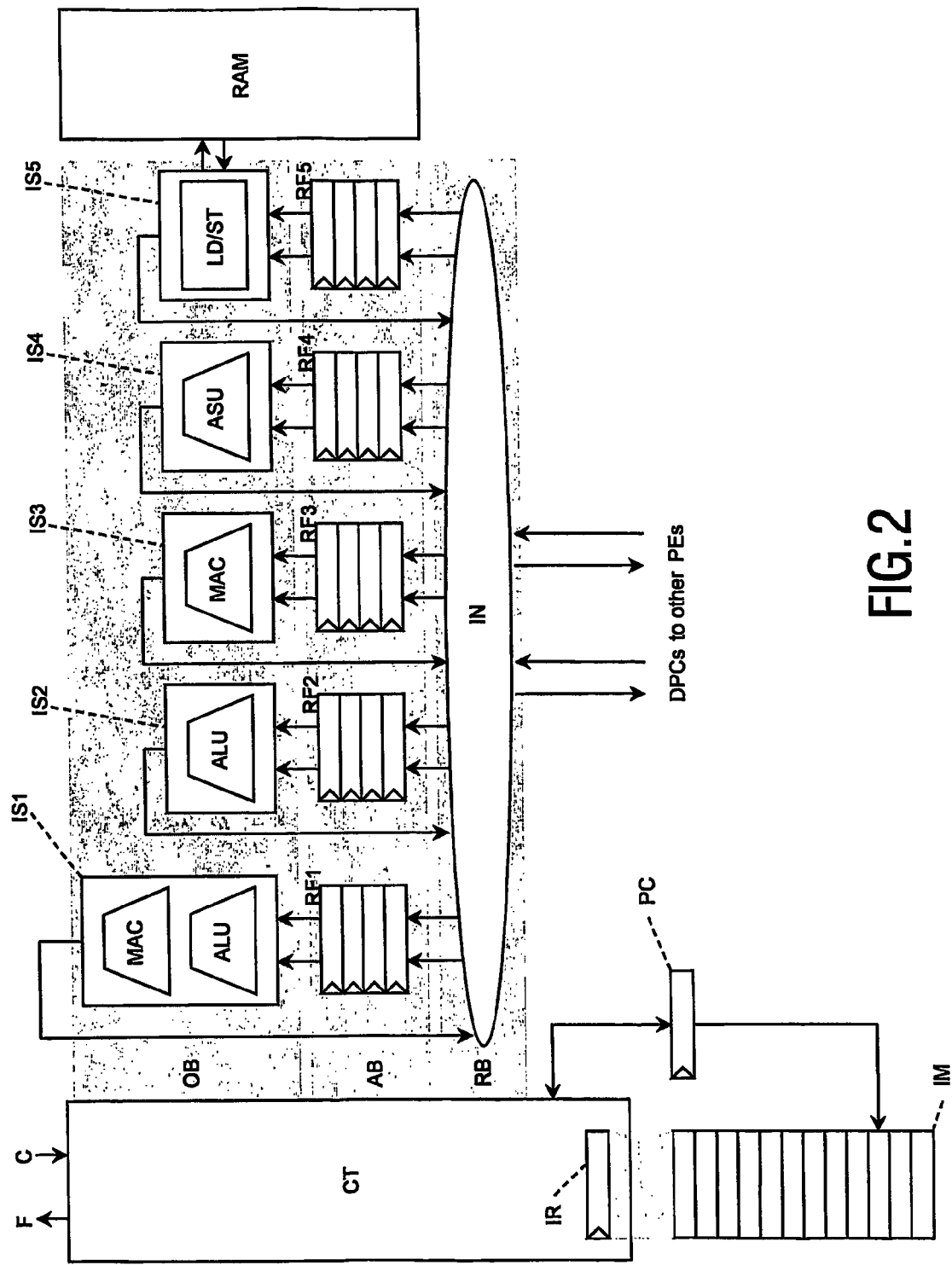
FIG. 2 shows an example of a processing element in more detail

FIG. 2 shows an example of a processing element in more detail. Each processing element comprises one or more operation issue slots (ISs), each issue slot comprising one or more functional units (FUs). The processing element in FIG. 2 comprises five issue slots IS1-IS5, and six FUs: Two arithmetic and logic units (ALU), two multiply-accumulate units (MAC), an application-specific unit (ASU), and a load/store unit (LD/ST) associated to a data memory (RAM). Issue slot IS1 comprises two FUs: An ALU and a MAC. FUs in a common issue slot share read ports from a register file and write ports to an interconnect network IN. In an alternative embodiment, a second interconnect network could be used in between register files and operation issue slots. The functional unit(s) in an issue slot have access to at least one register file associated to said issue slot. In FIG. 2, there is one register file associated to each issue slot. Alternatively, more than one issue slot could be connected to a single register file. Yet another possibility is that multiple, independent register files are connected to a single issue slot (e.g. one different RF for each separate read port of an FU in the issue slot). The data-path connections DPC between different PEs are also connected to the interconnect networks IN of the respective PEs. The FUs are controlled by a controller CT which has access to an instruction memory IM. A program counter PC determines the current instruction address in the instruction memory IM. The instruction pointed to by said current address is first loaded into an internal instruction register IR in the controller. The controller then controls data-path elements (function units, register files, interconnect network) to perform the operations specified by the instruction stored in the instruction register IR. To do so, the controller communicates to the functional units via an opcode-bus OB (e.g. providing opcodes to the function units), to the register files via an address-bus AB (e.g. providing addresses for reading and writing registers in the register file), and to the interconnect network IN through a routing-bus RB (e.g. providing routing information to the interconnect multiplexers). The controller has an input for receiving a cluster operation control signal C. This control signal C causes a guarded instruction, e.g. a conditional jump, to be carried out. The controller also has an output for providing an operation control signal F to other processing elements. This will be described in more detail in the sequel.

Figure 3:
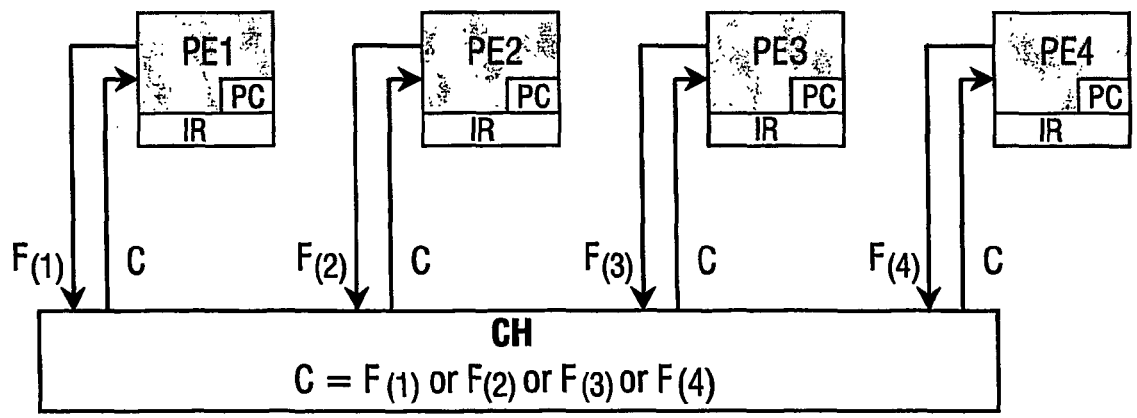
FIG. 3 shows an example of a cluster of 4 processing coupled to a channel CH.

FIG. 3 shows an example wherein a cluster of 4 processing elements $PE_1, \ldots, PE_4$, forming part of the processor shown in FIG. 1, and having a more detailed architecture as shown in FIG. 2, are coupled to a channel CH. Each of the processing elements can provide an operation control signal $F_1, \ldots, F_4$ to the channel CH. The channel returns a cluster operation control signal C being equal to $F_1$ OR $F_2$ OR $F_3$ OR $F_4$. Hence, if any of the processing elements PEj in the cluster activates its operation control signal $F_j$, then each of the processing elements receives an activated cluster operation control signal. This causes each of the processing elements $PE_1, \ldots, PE_4$ to execute their guarded operations in the same way as the processor PEj. A particular example of a guarded operation is a conditional jump. The cluster operation control signal enables the processing elements $PE_1, \ldots, PE_4$ to perform program execution in a lock-step mode, also in case of conditional jumps. In this way, instruction level parallelism may be exploited in that the program counter of both processing elements operate in a coupled mode. This has the result that the processing elements fetch instructions from corresponding addresses, i.e. possibly different physical addresses in the instruction memory which, nevertheless, comprise PE instructions which belong together in a coherent VLIW instruction. In this case, we say the different physical addresses correspond to the same logical address. In the same way, the cluster operation control signal may be used to control other conditional or guarded operations. In a preferred embodiment shown, the processing elements have a separate output for broadcasting their own operation control signal F and for monitoring the cluster operation control signal C. Alternatively, it is possible to apply a pull-down mechanism, wherein each of the processing elements can pull down the cluster operation control signal C. In that case, only one terminal is required.

The cluster operation control signal C is cluster-specific. Different clusters in the processor will have different and independent control signals C. To evaluate the cluster operation control signal for a given cluster, the channel should perform a logic OR operation of the operation control signals F of the PEs belonging to said cluster, but should ignore all operation control signals coming from PEs not belonging to said cluster. This way, the processor must comprise a reconfigurable channel infrastructure, so to allow for the formation of multiple and different clusters in the processor, each cluster is associated to a different cluster channel.

FIG. 4 shows, by way of example, how a processor comprising 7 processing elements $PE_1, \ldots, PE_7$ can be configured using a reconfigurable channel infrastructure having programmable sum-terms, such as PLAs. In the example shown, a first task unit is formed by the cluster of processing elements $PE_1$ and $PE_2$. A second task unit comprises the cluster of processing elements $PE_3, PE_4, PE_5, PE_6$, and a third task unit comprises a single processing element $PE_7$. Any other configuration can easily be programmed by setting (indicated as "x"s in FIG. 4) the programmable sum-terms.

Although the embodiment of the processor shown in FIG. 4 can be programmably reconfigured into independently operating task units, it has the disadvantage that each sum-term is spread across the entire controller array, being connected to every single one of the controllers. When the number of controllers is large, this could translate into very large and slow sum-terms. Moreover, the delay of a cluster channel (i.e. the time it takes to produce "C" after receiving all "F"s) will be dependent on the size of the total controller array, and not on the size of the cluster itself. Finally, the solution proposed in FIG. 4 also has many redundancies. Note, for instance, that four sum-terms are required to implement the channel in FIG. 3. The output of each of the four sum-terms is identical to the outputs of the other three sum-terms. Therefore, in principle, only one sum-term should suffice to implement said cluster channel, while the proposed solution will require 4 times larger hardware.

FIG. 5 shows an improved embodiment. By way of example, a first and a second processing element $PE_j$ and $PE_{j+1}$ are shown, forming part of a plurality of processing elements. The processing elements $PE_j$ and $PE_{j+1}$ are coupled to a reconfigurable channel infrastructure comprising a control chain CHN, and combination elements $CE_j$, $CE_{j+1}$ for each of the processing elements. The control chain CHN controls the transmission of a intermediate control signals in two directions, i.e. from a processing element $PE_j$ to its succeeding processing elements $PE_{j+1}, \ldots$ and from a processing element $PE_{j+1}$ to its preceding processing elements $PE_j, \ldots$. To that end, the control chain CHN comprises combination elements $C_{j,1}$ and $C_{j,2}$ for each processing element $PE_j$ and a switch $SW_{j,j+1}$ between each pair of neighbouring elements $PE_j$, $PE_{j+1}$. The combination element $C_{j,1}$ combines an intermediate control signal L1, generated by the combination of the operation control signals $F_{j-1}$, $F_{j-2}$, ... of the preceding processing elements $PE_{j-1}$, $PE_{j-2}$, ..., respectively, with the operation control signal $F_j$ of the processing element Pj, and provides the combined signal to the switch $SW_{j,j+1}$. Depending on the value of the configuration signal $E_{j,j+1}$, said combined signal is further transmitted to the succeeding processing element $P_{j+1}$. In an analogous way, the combination element $C_{j,2}$ combines an intermediate control signal L2, generated by the combination of the operation control signals $F_{j+1}$, $F_{j+2}$ ... of the proceeding processing elements $PE_{j+1}$, $PE_{j+2}$, ..., respectively, controllably passed by the switch $SW_{j,j+1}$, with the operation control signal $F_j$ of the processing element Pj, and provides the combined signal to the preceding switch $SW_{j-1,j}$. The combination element $CE_j$ provides the processing element PEj an active cluster operation control signal if the signal $F_j$ (produced by its own output) or one of the intermediate control signals L1, L2, is activated.

In the preferred embodiment shown in FIG. 6, the combination elements $C_{j,1}$ and $C_{j,2}$, as well as $CE_j$, $CE_{j+1}$, are implemented as OR-gates, and the switch $SW_{j,j+1}$ comprises AND gates. However, other types of logic gates may be used depending on the values assigned to the different signal states. If, for example, the active state of the operation control signal F and the cluster operation control signal C is assigned a value 0, instead of 1, then OR-gates are to be replaced by AND-gates and vice versa. Alternatively, a ternary or n-ary signal may be used to indicate the state of these control signals, requiring other logic gates. In yet another embodiment, the channel may use a pull-down or pull-up mechanism. The configuration signals $E_{j,j+1}$ are preferably provided by configuration memory elements. The configuration value stored therein may be provided by an external configuration bus, or by a separate configuration processor, or even by the processing elements themselves. Alternatively, the configuration values can be directly provided to the switches, instead of via a configuration memory. Preferably a set of memory cells used to program the switches is organized as a data-word in a memory. In an embodiment the memory may contain multiple data-words each containing a different configuration. Therein the programmable switches can be programmed by selecting one of these data-words. For example one or more of the processing elements can program the programmable switches by dynamically selecting the data-word in memory.

The architecture according to FIG. 5 can easily be extended to more dimensions, as is shown in FIG. 7 for a processor having processing elements arranged in a 2 dimensional grid. The implementation of the combination elements and the switches can be analogous to that of FIG. 6. For clarity, only one processing element $PE_{i,j}$, including associated circuitry for generating the cluster operation control signal C, is shown, but it will be clear to the skilled person that an arbitrary number of processing elements can be connected. In the embodiment of FIG. 7 the channel infrastructure comprises mutually transverse chains ($CHN_{i,j,H}$, $CHN_{i,j,V}$). More in particular the associated circuitry comprises a 'horizontal' chain $CHN_{i,j,H}$ to control a clustering of the processing element $PE_{i,j}$ with other processing elements succeeding or preceding it in a horizontal direction. It further comprises a 'vertical' chain $CHN_{i,j,V}$ to control a clustering of the processing element $PE_{i,j}$ with other processing elements succeeding or preceding it in a vertical direction. It is remarked that the wordings 'horizontal' and 'vertical' should be interpreted as any pair of orthogonal directions.

The switching element $SW_{i,j-1;i,j}$ of the horizontal chain $CHN_{i,j,H}$, controllably passes an input signal generated by one of the preceding processing element coupled to that chain as an intermediate control signal to the combination element $C_{i,j,1}$, which transmits an intermediate control signal to succeeding parts of the chain $C_{i,j,H}$. Likewise, the switching element $SW_{i,j;i,j+1}$ of that chain $CHN_{i,j,H}$ controllably passes a input signal generated by one of the succeeding processing elements coupled to that chain as an intermediate control signal to the combination element $C_{i,j,2}$, which transmits an intermediate control signal to preceding parts of the chain $CHN_{i,j,H}$. Analogously, intermediate control signals are controllably transmitted by the vertical chain $CHN_{i,j,V}$, in a direction transverse to that of the horizontal chain $CHN_{i,j,H}$. In addition, the intermediate control signals L1, L2, transmitted through the horizontal chain $CHN_{i,j,H}$, are forwarded to the combination elements $C_{i,j,3}$, $C_{i,j,4}$ in the vertical chain $CHN_{i,j,V}$. Analogously, the intermediate control signals L3, L4, transmitted through the vertical chain $CHN_{i,j,V}$, are forwarded to the combination elements $C_{i,j,1}$, $C_{i,j,2}$ in the horizontal chain $CHN_{i,j,H}$. This allows for the formation of "L"-shaped and arbitrary rectangular clusters. The combination element $CE_{i,j}$ combines the intermediate control signals L1, L2, L3 and L4 with the operation control signal provided by the processing element $PE_{i,j}$ itself and provides the cluster operation control signal C to that processing element $PE_{i,j}$.

It is noted that the logical functions of the combination element CEi,j and the combination elements Ci,j,1 and Ci,j,2 can be cross-optimised. More specifically:

Ci,j,1 computes: F OR L3 OR L4 OR L1
Ci,j,2 computes: F OR L3 OR L4 OR L2
CEi,j computes: F OR L1 OR L2 OR L3 OR L4

So in a hardware implementation, the logic of all three combiners (CE and the two C's) can be cross-minimized, i.e. gates can be re-used across different combiners. In essence, all basic operations done in the combination element CE are already done in the C's, so CE is just a conceptual block (fundamental, nevertheless!). The same rationale applies for the vertical channel. So the logic of all 5 combiners (one CE and four C's) in FIG. 7 can be minimized through gate re-use across combiners. For the purpose of clarity however the combination element CEi,j is shown in FIG. 7 as a separate function. The skilled person will see that pipeline registers can be inserted in different points of the reconfigurable channel infrastructure to reduce signal propagation delay, to remove loops in the logic, or any other purpose, as long as the corresponding added cycles are taken into account in the programming of the processing elements.

It will also be clear to the skilled person that the possibilities for forming clusters by programming the switches in the proposed reconfigurable channel infrastructure are numerous and growing exponentially with the number of processing elements available.

By way of example this is illustrated in FIGS. 8a to 8d for a processing system comprising 4 processing elements which are arranged in a rectangle. In FIG. 8a the processing elements are operating independently of each other. It is assumed that the switches for selectively transmitting control signals are arranged between the nearest neighbours. Hence a diagonal transmission of the control signals from for example PE1 to PE3 is not allowed, although the control signals may be transmitted via PE2 or PE4. This is however not a strict requirement. Basically the channel infrastructure may extend between any pair of processing elements, but for layout purposes the channel infra structure is preferably composed from controllable connections between pairs of neighbouring processing elements.

FIG. 8b shows the four possible ways in this case to configure the processing system as three task units. A bar between two processing elements indicates that these processing elements are joined into a cluster.

FIG. 8c shows the six possible ways to configure the processing system as six task units.

FIG. 8c shows a the configuration of the processing system wherein all processing elements are clustered into a single task unit.

It is remarked that the scope of protection of the invention is not restricted to the embodiments described herein. It will be clear to the skilled person that logic functions can be implemented in a plurality of ways. For example instead of performing a logical OR function on active high signals a logic AND function can be applied to active low signals. Alternatively these functions could be implemented by a pull down mechanism or by a lookup table. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A processing system comprising a plurality of processing elements, the processing elements comprising a controller and computation means, the plurality of processing elements being dynamically reconfigurable by a cluster control signal as mutually independently operating task units that comprise one processing element or a cluster of two or more processing elements, the processing elements within a cluster being arranged to execute instructions under a common thread of program control, wherein the cluster control signal is derived from intermediate control signals transmitted through a reconfigurable channel infrastructure connected to the processing elements, wherein the reconfigurable channel infrastructure comprises a control chain with combination elements for each processing element and a programmable switch between each pair of neighboring processing elements for locally controllably inhibiting transmission of intermediate control signals to a preceding or a succeeding processing element.

2. Processing system according to claim 1, wherein processing elements organized in a task unit share the cluster control signal for controlling instruction execution.

3. Processing system according to claim 2, wherein the cluster control signal is a flag controlling a guarded operation.

4. Processing system according to claim 3, wherein the guarded operation is a conditional jump.

5. Processing system according to claim 1, wherein the processing elements are connected to each other via data-path connections.

6. Processing system according to claim 5, wherein the data-path connections are limited to neighbor-to-neighbor connections.

7. Processing system according to claim 1, wherein the cluster control signal is derived by combining the intermediate control signals through a combination element associated with each processing element.

8. Processing system according to claim 7, wherein the combination element associated with each processing element consists of an OR-gate.

9. Processing system according to claim 1, wherein the reconfigurable channel infrastructure comprises programmable sum-terms.

10. Processing system according to claim 1, wherein the reconfigurable channel infrastructure comprises programmable product-terms.

11. Processing system according to claim 1, wherein the reconfigurable channel infrastructure comprises mutually transverse chains.

12. Processing system according to claim 11, wherein the combination elements are arranged in chains having a first orientation and chains having a second orientation, and wherein the intermediate control signals transmitted through the chains having the first orientation are forwarded to the combination elements in the chains having the second orientation.

13. Processing system according to claims 12, wherein the intermediate control signals transmitted through the chains having the second orientation are forwarded to the combination elements in the chains having the first orientation.

14. Processing system according to claim 1, wherein the combination elements consist of OR-gates.

15. Processing system according to claim 1, wherein the programmable switch between neighboring processing elements comprises AND-gates.

16. Processing system according to claims 1, wherein the programmable switch between neighboring processing elements is programmed by a signal stored in a memory cell.

17. Processing system according to claim 16, wherein at least one of the processing elements can write to at least one memory cell.

18. Processing system according to claim 16, wherein a set of memory cells used to program a set of the programmable switches between neighboring processing elements is organized as a data-word in a memory.

19. Processing system according to claim 18, wherein the memory contains multiple data-words, and wherein the programmable switches are programmed by selecting one of the data-words.

20. Processing system according to claims 19, wherein one or more of the processing elements can program the programmable switches by dynamically selecting the data-word in memory.

21. Processing system according to claims 16, wherein the memory consists of volatile random access memory.

22. Processing system according to claim 1, wherein each single processing element is capable of executing a VLIW instruction.

23. Processing system according to claim 22, wherein the processing element comprises an internal interconnect network.

24. Processing system according to claim 23, wherein the internal interconnect network consists of point-to-point connections.

25. Processing system according to claim 23, wherein the internal interconnect network comprises data-path connections to a set of operation issue slots within the processing elements.

26. Processing system according to claim 1, wherein the processing elements are arranged in a 2-dimensional grid.

27. Method for operating a processing system comprising a plurality of processing elements, the processing elements comprising a controller and computation means, the method comprising the steps of:

combining, by a combination element, an intermediate control signal with an operation control signal of a processing element and selectively passing the combined signal to a further processing element, deriving a cluster control signal from an operation control signal and two or more intermediate control signals, and dynamically reconfiguring a processing element by the cluster control signal thereby dynamically reconfiguring the plurality of processing elements as mutually independently operating task units that comprise one processing element or a cluster of two or more processing elements, wherein the processing elements within a cluster execute instructions under a common thread of program control.

* * * * *